United States Patent [19]
Ballèvre et al.

[11] Patent Number: 5,849,335
[45] Date of Patent: Dec. 15, 1998

[54] COMPOSITION AND METHOD FOR PROVIDING GLUTAMINE

[75] Inventors: Olivier Ballèvre, Lausanne, Switzerland; Krishna Anantharaman, Bridgewater, Conn.; Julio Boza, La Conversion-Lutry; Clara-Lucia Garcia-Rodenas, Mollie-Margot, both of Switzerland

[73] Assignee: Nestec S.A., Vevey, Switzerland

[21] Appl. No.: 869,866

[22] Filed: Jun. 2, 1997

[51] Int. Cl.⁶ .......................... A61K 35/20; A61K 35/78; A61K 39/385
[52] U.S. Cl. ...................... 424/535; 424/195.1; 514/562; 514/563
[58] Field of Search ..................................... 514/563, 562; 424/195.1, 535

[56] References Cited

U.S. PATENT DOCUMENTS 5,229,136  7/1993  Mark et al. .

FOREIGN PATENT DOCUMENTS

| | | |
|---|---|---|
| 0 616 780 A2 | 9/1994 | European Pat. Off. . |
| 0 689 771 A1 | 1/1996 | European Pat. Off. . |
| 9300536 | 10/1994 | Netherlands . |
| 2 0 14 424 | 8/1979 | United Kingdom . |

OTHER PUBLICATIONS

Khaled, Life Science Tech; Inc. (CA. 118: 87649) (abstract) 1993.
Azuma, Sch. Med., Kitasato Univ. Japan 22(6), 583–96 (Abstract) (CA 119: 27188), 1993.
Winitz (CA73: 86768) (Abstract) 1970.
Hammarqvist et al, "Addition of Glutamine to Total Parenteral Nutrition After Elective Abdominal Surgery Spares Free Glutamine in Muscle, Counteracts the Fall in Muscle Protein Synthesis, and Improves Nitrogen Balance," *Ann. Surg.*, vol. 209, No. 4, pp. 455–461 (1989).
Hughson, "Health snacks make headway," *Foodline* Abstract No. 00373931 (1996).
Kuhn et al, "Glutamine Content of Protein and Peptide–Based Enteral Products," *Journal of Parenteral and Enteral Nutrition*, vol. 20, No. 4, pp. 292–295 (1996).
Lacey et al, "Is Glutamine a Conditionally Essential Amino Acid?," *Nutrition Reviews*, vol. 48, No. 8 (1990).
Li et al, "Glutamine Prevents Parenteral Nutrition–Induced Increases in Intestinal Permeability," *Journal of Parenteral and Enteral Nutrition*, vol. 18, No. 4, pp. 303–307 (1994).
Maza et al, "Carob Bean Germ Seed (Ceratonia Siliqua): Study of the Oil and Proteins," *J Sci Food Agric*, vol. 46, pp. 495–502 (1989).
Stehle et al, "Effect of Parenteral Glutamine Peptide Supplements on Muscle Glutamine Loss and Nitrogen Balance After Major Surgery," *The Lancet*, pp. 231–233 (1989).
Barbieri et al, "Optimization of non–conventional protein mixtures for food use," *FSTA* Abstract No. 00249112 (1983).
Del Re–Jiménez et al, "Comparative study of the chemical composition of germ meals from carob, guar and tara seeds," *Food Hydrocolloids*, vol. 3, No. 2, pp. 149–156 (1989).
Drouliscos et al, "Nutritional evaluation of the germ meal and its protein isolate obtained from the carob seed (Ceratonia siliqua) in the rat," *Br. J. Nutr.*, vol. 43, pp. 115–123 (1980).
Gianotti et al, "Oral Glutamine Decreases Bacterial Translocation and Improves Survival in Experimental Gut–Origin Sepsis," *Journal of Parenteral and Enteral Nutrition*, vol. 19, No. 1, pp. 69–74 (1995).

*Primary Examiner*—Leonard Schenkman
*Attorney, Agent, or Firm*—Hill & Simpson

[57] ABSTRACT

A nutritional composition for providing glutamine to a human or animal. The protein source of the composition includes carob protein which is rich in glutamine. A source of Met may also be included. The composition may be used in the treatment of stressed patients; for example those patients who are critically ill, suffering from sepsis, injury, burns, or inflammation, or who are recovering from surgery. Further, the composition may be used to raise plasma glutamine levels; for example in athletes after intense exercise.

33 Claims, No Drawings nal composition for providing glutamine to a human or animal. The invention also relates to a method for providing glutamine to a human or animal and to a method for the treatment of humans and animals requiring supplemental glutamine.

BACKGROUND OF THE INVENTION

The amino acid glutamine has many important functions in the body. For example, glutamine acts as the primary vehicle for transfer of amino nitrogen from skeletal muscle to visceral organs, as a fuel for the rapidly dividing cells of the gastrointestinal tract and immune system, and as a substrate that permits the kidneys to excrete acid loads and protect the body against acidosis. Further, there is increasing evidence that glutamine is essential to the proper functioning of host defense mechanisms and wound healing.

Despite these functions, glutamine is traditionally classified as non-essential amino acid. The reason is that the body is generally able to synthesize sufficient glutamine for its needs from glutamate and glutamic acid. Also, glutamine is the most abundant amino acid in the blood and free amino acid pool of the body. However, this is only true in periods of good health and does not apply to preterm babies. During periods of illness, the metabolic rate of glutamine increases and the body is not able to synthesize sufficient glutamine to meet its needs. This is particularly true during episodes of stress such as sepsis, injury, burns, inflammation, diarrhea and surgery. During episodes of stress, there is a marked increase in glutamine consumption by the gastrointestinal tract, immune cells, inflammatory tissue and the kidney. This consumption may far outstrip the endogenous rate of synthesis of glutamine. As the deficiency becomes manifest, tissue function alters, morphological changes may be observed, and a negative nitrogen balance arises. Similarly, preterm babies have a lower rate of glutamine synthesis; often insufficient for needs. Further, it is found that athletes, after intense exercise, have reduced levels of glutamine in their plasma.

The administration of glutamine supplemented diets to preterm babies, during periods of stress, or to athletes has resulted in improvement of the person's condition. For example, glutamine supplemented diets have been shown to regenerate muco-proteins and intestinal epithelium, support gut barrier function, shorten hospital stay, improve immune function, and enhance patient survival (Stehle et al; 1989; *Lancet*, 1:231–3; Hammerqvist et al; 1989; *Ann. Surg.*; 209:455–461; Li et al; 1995; *J. Parenter. Enteral Nutr.*, 18, 303–307 and Gianotti et al; 1995; *J Parenter. Enteral Nutr.*, 19, 69–74). Therefore glutamine is now considered to be a conditionally essential amino acid for critically ill and other stressed patients (Lacey et al; 1990; *Nutrition Review*, 48:297–309).

The additional need for glutamine during periods of stress must come from an exogenous source such as diet. However the supplementation of nutritional formulas with glutamine has traditionally not been performed because glutamine has long been considered to be a non-essential amino acid. Also glutamine is only slightly soluble in water and, more importantly, is relatively unstable in solution. To overcome the stability problem, it has been proposed to supplement powdered formulas with L-glutamine. These formulas are then reconstituted immediately prior to administration.

However, for enteral formulas, this approach has not proved to be particularly successful since glutamine in its free form may be converted to glutamate by stomach acids prior to absorption. Also, health care professionals prefer ready-to-consume liquid formulas as opposed to powdered formulas.

Another method of supplementing diet with glutamine has centered on the use of gluten or gluten hydrolysates as a protein source for nutritional compositions. Gluten is particularly rich in glutamine and is hence a good source of glutamine. Also, the use of gluten or a gluten hydrolysate offers the advantage of providing the glutamine in a form which is stable and relatively soluble. However gluten is potentially allergenic and this has severely limited its use in nutritional formulas. This problem may be ameliorated to some extent by using a gluten hydrolysate instead of gluten and a nutritional composition based on gluten hydrolysate is commercially available under the trade name Nutricomp® Immun. However, although the risk from allergenic reaction is much reduced, it has not been removed entirely.

A yet further approach has been to supplement nutritional formulas with synthetic dipeptides such as L-alanyl-L-glutamine or L-glycyl-L-glutamine. These dipeptides are stable in solution and have been shown to be an effective form of glutamine supplementation. However, synthetic peptides of this nature may significantly increase the cost of the nutritional formulas.

Therefore there is a need for a nutritional composition which is rich in an inexpensive, stable form of glutamine and which has a negligible risk of inducing allergenic reactions.

SUMMARY OF THE INVENTION

Accordingly, in one aspect, this invention provides a nutritional composition for providing glutamine, the composition being in powdered, liquid concentrate or ready-to-drink liquid form and comprising: a protein source including carob protein.

It has been surprisingly discovered that carob protein provides an excellent source of glutamine in a form which is stable and which has very little or no risk of inducing allergenic reactions. Further, carob protein provides the additional advantage of a substantially balance amino acid profile. Also, carob protein is rich in arginine; an amino acid which is useful in the nutrition of stressed patients suffering impairment of the immune system.

In another aspect, this invention provides a nutritional composition for providing glutamine, the composition having a protein source comprising carob protein and a source of Met. Preferably a source of Cys and Met is provided to provide at least 24 mg/g protein of Cys and Met. Preferably the source of Cys and Met is selected from whey or casein or both. A source of tryptophan may also be included.

In a yet further aspect, this invention provides a nutritional composition for providing glutamine, the composition having a protein source comprising an isolate or hydrolysate of carob protein.

Preferably, the nutritional composition further comprises a carbohydrate source; and a lipid source. The protein source preferably provides about 10% to about 30% of the energy of the nutritional composition; the carbohydrate source about 35% to about 60% of the energy of the nutritional composition; and the lipid source about 20% to about 40% of the energy of the nutritional composition.

In another aspect, this invention provides a method of providing glutamine to a human or animal, the method comprising enterally administering to the human or animal an effective amount of a nutritional composition having a protein source including carob protein.

In yet another aspect, this invention provides a method of increasing plasma glutamine levels in a human or animal, the method comprising enterally administering to the human or animal an effective amount of a nutritional composition having a protein source including carob protein.

Preferably the human or animal is a stressed patient, preterm baby, or athlete. Examples of stressed patients are patients who are critically ill, or who are suffering from sepsis, injury, burns, or inflammation, or patients recovering from surgery.

In a further aspect, this invention provides a method of improving the immune function of a stressed patient or athlete by providing glutamine and arginine to the patient, the method comprising administering to the patient or athlete an effective amount of a nutritional composition having a protein source including carob protein.

In a further aspect, this invention provides a method of providing glutamine to patients suffering from injured or diseased intestines or to maintain the physiological functions of the intestine, the method comprising enterally administering to the patient an effective amount of a nutritional composition having a protein source including carob protein.

In a yet further aspect, this invention provides the use of carob protein in the preparation of an enterally administrable, nutritional composition for providing glutamine to a human or animal.

DETAILED DESCRIPTION OF PREFERRED EMBODIMENTS OF THE INVENTION

Embodiments of the invention are now described by way of example only. The invention is concerned with the provision of glutamine to humans or animals and is based on the use of carob protein as a source of glutamine. Carob protein, usually in the form of carob germ protein, may be obtained from carob germ meal, a by-product obtained from the germ of the carob bean (*Ceratonia siliqua*) after the separation of the gums and fibrous coating of the seed. Carob germ meal contains about 40% to about 60% protein and is hence an excellent source of protein. Further, the carob bean is a perennial tree which is widely cultivated; particularly in the Mediterranean region and is hence readily available.

Many attempts at determining the amino acid composition of carob protein have been made in the past. All reported attempts have used techniques based upon acid hydrolysis of the protein followed by automated amino acid analysis. Although these techniques provide reasonably accurate results for most amino acids, they provide poor results for glutamine. The reason is that glutamine breaks down in the presence of heat and acid to form glutamic acid and ammonia. Consequently almost all of the reported analyses of carob protein report glutamine and glutamic acid as a summation value; if reported at all. However procedures have recently been developed which permit the accurate determination of protein and peptide bound glutamine. For example, methods involving the conversion of glutamine residues to acid stable L-2,4-diaminobutyric acid in the presence of bis(1,-trifluoroacetoxy)iodobenzene (Kuhn et al; 1996; *J Parent. Enteral Nutr.,* 20, 4:292–295) or methods involving the enzymatic hydrolysis of the protein. When analyzed using these techniques, carob protein has a glutamine content of about 15.5 to about 17.5 g/100 g amino acids. In other words, relatively rich in glutamine and an excellent source of glutamine. Further carob protein has the advantage that it contains about 12 g/100 g amino acids of arginine.

The carob protein may be in any suitable form, for example in the form of carob germ meal, a carob germ protein isolate or concentrate, or a carob germ protein hydrolysate. Preferably, the carob protein is treated to inactivate any proteolytic inhibitors which may be present. This may be carried out, for example, by subjecting the carob protein to heat treatment.

The protein source may include other types of protein in addition to carob protein; for example, casein, whey, soy, rice and oat bran protein, or mixtures thereof. The protein may be in intact form or hydrolyzed form. Further, the protein source may include free amino acids. Although carob protein has a reasonably well balanced amino acid profile which fulfills the recommendations of the FAO/WHO expert committee for the essential amino acid requirements for children>2 years, the amino acid profile may be further improved by mixing in other types of protein or free amino acids. This is particularly the case with other types of protein or free amino acid mixtures which are rich in sulfur-containing amino acids such as methionine and cysteine. Whey and casein are particularly suitable source of Met and Cys. A source of tryptophan is also conveniently included; for example in free amino acid form.

The carob protein may provide about 40% to about 100% by weight of the protein source; for example about 60% to about 80% by weight. The protein source preferably includes whey, casein, or mixtures of whey and casein; for example in an amount of about 10% to about 30% by weight. The protein source preferably provides about 10% to about 30% of the energy of the nutritional composition; for example about 15% to about 25% of the energy of the nutritional composition.

The carbohydrate source may provide about 35% to about 60% of the energy of the composition. For example, the carbohydrate source may provide about 45% of the energy of the nutritional composition. Several carbohydrates may be used including maltodextrin, corn starch, or sucrose, or mixtures thereof. Preferably the carbohydrate source is free from lactose.

The lipid source may provide about 20% to about 40% of the energy of the composition. For example, the lipid source may provide about 30% of the energy of the nutritional composition. The lipid source may include a mixture of medium chain triglycerides (MCT) and long chain triglycerides (LCT). For example, the lipid source may include at about 20% to about 80% by weight of medium chain triglycerides. For example, medium chain triglycerides may make up about 70% by weight of the lipid source. Suitable sources of long chain triglycerides are canola oil, soy oil, milk fat, corn oil, residual milk fat, and soy lecithin, or mixtures thereof. Coconut oil is a suitable source of medium chain triglycerides.

The lipid source may have a lipid profile designed to have a polyunsaturated fatty acid omega-6 (n-6) to omega-3 (n-3) ratio of about 4:1 to about 15:1. For example, the n-6 to n-3 fatty acid ratio may be about 7:1. Further, for patients suffering from inflammatory conditions, the lipid source may contain low levels of omega-6 fatty acids and higher levels of omega-3 fatty acids. Preferably the omega-6 fatty acids provide less than about 10% of total energy. For example these polyunsaturated fatty acids may provide about 4% of total energy. Decreasing the levels of these polyunsaturated fatty acids is believed to decrease sensitivity to peroxydation; which may be beneficial in the treatment of inflammatory diseases. In addition to the absorption/ tolerance benefits of a moderate content of long chain triglycerides, the nutritional composition is less likely to be immunosuppressive due to the low content of omega-6 fatty acids.

The enteral composition preferably includes a complete vitamin and mineral profile. For example, sufficient vitamins and minerals may be provided to supply about 75% to about 250% of the recommended daily allowance of the vitamins and minerals per 1000 calories of the nutritional composition.

The nutritional composition may include a source of beta-carotene. Beta-carotene, formerly considered only as a precursor to vitamin A, is an important nutrient with anti-oxidant properties. For example, the composition may include about 0.5 to about 2.0 mg of beta-carotene per 1000 calories. This amount of beta-carotene is sufficient to maintain plasma beta-carotene concentration in the patient.

The nutritional composition may be in any suitable form. For example, the composition may be in the form of formulas such as soluble powders, liquid concentrates, or ready-to-use formulations. Ready to use formulations are particularly preferred. The composition may be fed to a patient via a nasogastric tube or by having the patient drink it. Various flavors, fibers and other additives may also be present. The composition may also be in the form of common foodstuffs; for example yogurts, soups, pastas, porridges, breakfast cereals, convenience foods such as muesli bars, and the like. For animals such as pets, the composition may be in the form of dried or canned petfood.

The nutritional composition may be produced as is conventional; for example, for formulas, the nutritional composition may be prepared by blending together the protein source, the carbohydrate source, and the lipid source. If used, the emulsifiers may be included in the blend. The vitamins and minerals may be added at this point but are usually added later to avoid thermal degradation. Any lipophilic vitamins, emulsifiers and the like may be dissolved into the lipid source prior to blending. Water, preferably water which has been subjected to reverse osmosis, may then be mixed in to form a liquid mixture. The temperature of the water is conveniently about 50° C. to about 80° C. to aid dispersal of the ingredients. Commercially available liquefiers may be used to form the liquid mixture.

The liquid mixture may then be thermally treated to reduce bacterial loads. For example, the liquid mixture may be rapidly heated to a temperature in the range of about 80° C. to about 110° C. for about 5 seconds to about 5 minutes. This may be carried out by steam injection or by heat exchanger; for example a plate heat exchanger.

The liquid mixture may then be cooled to about 60° C. to about 85° C.; for example by flash cooling. The liquid mixture is then homogenized; for example in two stages at about 7 MPa to about 40 MPa in the first stage and about 2 MPa to about 14 MPa in the second stage. The homogenized mixture may then be further cooled to add any heat sensitive components; such as vitamins and minerals. The pH and solids content of the homogenized mixture is conveniently standardized at this point.

If it is desired to produce a powdered nutritional composition, the homogenized mixture is transferred to a suitable drying apparatus such as a spray drier or freeze drier and converted to powder. The powder should have a moisture content of less than about 5% by weight. If it is desired to produce a liquid nutritional composition, the homogenized mixture is preferably aseptically filled into suitable containers. Aseptic filling of the containers may be carried out by pre-heating the homogenized mixture (for example to about 75° to 85° C.) and then injecting steam into the homogenized mixture to raise the temperature to about 140° to 160° C.; for example at about 150° C. The homogenized mixture may then be cooled, for example by flash cooling, to a temperature of about 75° to 85° C. The homogenized mixture may then be homogenized, further cooled to about room temperature and filled into containers. Suitable apparatus for carrying out aseptic filling of this nature is commercially available.

The nutritional composition may be used as a nutritional support. In particular, the nutritional composition may be used to provide nutrition and glutamine to animal and humans. In particular, the nutrition composition may be used to provide nutrition and glutamine to stressed patients; for example for patients who are critically ill, or who are suffering from sepsis, injury, burns, or inflammation, or patients recovering from surgery. Further, the nutritional composition may be used to provide glutamine to patients suffering from injured or diseased intestines or to maintain the physiological functions of the intestine. Moreover, the nutritional composition may be used to raise plasma glutamine levels in humans and animals.

Further, since the nutritional composition contains enriched levels of arginine, the nutritional composition may also be used as a source of both glutamine and arginine; for example for patients suffering immune system impairment.

The nutritional composition may also be used to provide glutamine to athletes after intense exercise or to preterm babies.

It is to be understood that, although the nutritional composition is intended primarily for patients who require supplemental glutamine, it may also be used as a source of nutrition for people who are not suffering from any illness or condition.

The nutritional composition may form the sole source of nutrition or form a supplement to other nutritional sources; including parenterally administered nutrition.

The amount of the nutritional composition required to be fed to a patient will vary depending upon factors such as the patient's condition, the patient's body weight, the age of the patient, and whether the nutritional composition is the sole source of nutrition. However the required amount may be readily set by a medical practitioner. In general, sufficient of the nutritional composition is administered to provide the patient with about 1 g protein to about 4.0 g protein per kg of body weight per day. For example, an adult, critically ill patient may be administered about 1.5 g protein to about 2.0 g protein per kg of body weight per day, a preterm infant may be administered about 2.0 g protein to about 4.0 g protein per kg of body weight per day, and a infant may be administered about 2.0 g protein to about 3.0 g protein per kg of body weight per day. Further, for stressed patients, sufficient of the nutritional composition is preferably administered to provide the patient with about 10 g to about 25 g of glutamine per day. The nutritional composition may be taken in multiple doses, for example 2 to 5 times, to make up the required daily amount or may taken in a single dose.

Example 1

Young, weaned male rats, which are 21 days old are used. The rats are weighed and then fed for three days on a diet which contains carbohydrates, lipids and n10% casein protein and which is supplemented with 0.2% by weight methionine. The rats have free access to the diet and water. The rats are then weighed again. Two experimental diets are prepared by subjecting carob meal to heat treatment at 121° C. for about 30 minutes to inactivate proteolytic inhibitors. Methionine is then added to a level of 0.2% by weight. The mixture is then formulated with carbohydrates and lipids to provide two feeds; one containing about 10% by weight of carob protein (Feed 1) and the other containing about 20% by weight carob protein (Feed 2).

A group of rats is divided into three different sub-groups. One sub-group is provided with the casein based diet as control, another sub-group is provided Feed 1 and the third sub-group is provided Feed 2. All rats have free access to water and the feeds for the duration of the study. The rats are each weighed prior to commencement of the study and after the study. The study is continued for 4 weeks.

The rats fed Feed 1 and Feed 2 grow and gain weight at substantially the same rate as those fed the control diet. Further, the protein efficiency ratio (PER) for Feeds 1 and 2 is determined to be about 2.95; which is acceptable. The rats fed Feeds 1 and 2 are examined for toxic effects and none are found.

The trial indicates that feeds containing carob protein are well tolerated, support growth and have an acceptable PER.

Example 2

A ready-to-drink nutritional composition is prepared. The nutritional composition includes the following components:

| Component | Amount per liter | Energy % |
|---|---|---|
| Protein | | 25 |
| Carob germ: acid whey (80:20) | | |
| Carbohydrate | | 45 |
| Corn syrup solids | | |
| Sucrose | | |
| Lipids | | 30 |
| Corn oil, Canola oil, | | |
| Soy lecithin, Residual Milk fat, | | |
| Coconut oil (MCT's) | | |
| Vitamins | | |
| Vitamin A | 4000 IU | |
| β-carotene | 2.0 mg | |
| Vitamin D | 400 IU | |
| Vitamin E | 60 IU | |
| Thiamin | 3.0 mg | |
| Pyridoxine | 4.0 mg | |
| Biotin | 400 μg | |
| Minerals | | |
| Zinc | 24 mg | |
| Copper | 2.0 mg | |
| Magnesium | 4.0 mg | |
| Selenium | 100 μg | |
| Sodium | 876 mg | |
| Potassium | 1500 mg | |
| Chloride | 1300 mg | |

The nutritional composition has an energy density of 1500 kcal/l and a ratio of ω6 fatty acids to ω3 fatty acid of about 7:1. The nutritional composition has the following amino acid composition:

| Amino acid | Amount (mg/g protein) | Percentage of FAO/WHO requirements for > 2 years |
|---|---|---|
| Ile | 37.94 | 135% |
| Leu | 76.1 | 115% |
| Lys | 68.1 | 117% |
| Met | 11.4 | — |
| Cys | 17.9 | — |
| Met + Cys | 29.3 | 117% |
| Phe | 32.9 | — |
| Tyr | 33.6 | — |
| Phe + Tyr | 66.5 | 106% |
| Thr | 40.8 | 120% |
| Trp | 11.0 | 100% |
| Val | 42.8 | 122% |
| Arg | 102.4 | — |
| His | 25.9 | 136% |
| Ala | 44.0 | — |
| Asp | 89.3 | — |
| Glu + Gln | 243.4 | — |
| Gln | 149.2 | — |
| Gly | 42.9 | — |
| Pro | 38.4 | — |
| Ser | 45.3 | — |

Therefore the nutritional composition fully meets the FAO/WHO recommendations for children over the age of 2 years. Further, the nutritional composition contains about 15 g/100 g of amino acids of glutamine and about 10 g/100 g of amino acids of arginine.

Example 3

Twelve adults, of both sexes and between the ages of 20 to 60 years, are recruited for the study. All adults have been diagnosed as requiring oesogastrectomy surgery. The patients are separated into two groups; a control group and a test group.

One day prior to undergoing surgery, the glutamine concentrations in intracellular skeletal muscle and plasma are determined for each patient. Further determinations of glutamine concentrations in intracellular skeletal muscle and plasma are made on days 1, 2, 4, 8, and 12 after surgery. The weight of the patient one day prior to undergoing surgery and 12 days after surgery are determined. Each patient's wound is examined on days 4 and 12 after surgery.

After undergoing surgery, all patients are fed for two days using a standard parenteral formula. The parenteral formula contains less than about 6 g of glutamine per 100 g of amino acids. After two days, the patients of the control group are fed using a standard, enterally administered formula; initially using a nasogastric tube and then orally. The standard enteral formula contains less than about 8 g of glutamine per 100 g of amino acids. The patients of the test group are fed the nutritional composition of example 2 after two days. The patients receive about 2 liters of the formulas per day.

For all patients prior to surgery, the glutamine concentrations for intracellular skeletal muscle and plasma are substantially normal; about 10 to 15 μmol/g wet tissue and 0.6 mM/l respectively. After surgery, the glutamine concentrations drop; reaching values about one third less after two days. For the patients of the test group, the glutamine concentrations thereafter increase reaching substantially normal levels after about 12 days. The glutamine concentrations of the patients of the control groups remain reduced after 12 days.

The wounds of patients of the test group are determined to have healed to a much greater extent than those of the control group. Also the patients of the test group are subjected to less weight loss after 12 days than the patients of the control group.

Example 4

A ready-to-drink nutritional composition is prepared. The nutritional composition includes the following components:

| Component | Amount per liter | Energy % |
|---|---|---|
| Protein | | 25 |
| Carob germ:oat bran:whey (61:25:14) | | |
| Carbohydrate | | 45 |
| Corn syrup solids | | |
| Sucrose | | |
| Lipids | | 30 |
| Corn oil, Canola oil, | | |
| Soy lecithin, Residual Milk fat | | |
| Coconut oil (MCT's) | | |
| Vitamins | | |
| Vitamin A | 4000 IU | |
| β-carotene | 2.0 mg | |
| Vitamin D | 400 IU | |
| Vitamin E | 60 IU | |
| Thiamin | 3.0 mg | |
| Pyridoxine | 4.0 mg | |
| Biotin | 400 μg | |
| Minerals | | |
| Zinc | 24 mg | |
| Copper | 2.0 mg | |
| Magnesium | 4.0 mg | |
| Selenium | 100 μg | |
| Sodium | 876 mg | |
| Potassium | 1500 mg | |
| Chloride | 1300 mg | |

The nutritional composition has an energy density of 1500 kcal/l and a ratio of ω6 fatty acids to ω3 fatty acid of about 7:1. The nutritional composition has the following amino acid composition:

| Amino acid | Amount (mg/g protein) | Percentage of FAO/WHO requirements for > 2 years |
|---|---|---|
| Ile | 38.3 | 137% |
| Leu | 74.3 | 113% |
| Lys | 59.8 | 103% |
| Met | 12.5 | — |
| Cys | 20.3 | — |
| Met + Cys | 32.8 | 131% |
| Phe | 38.1 | — |
| Tyr | 35.9 | — |
| Phe + Tyr | 74.1 | 118% |
| Thr | 42.6 | 125% |
| Trp | 12.2 | 111% |
| Val | 46.5 | 133% |
| Arg | 96.7 | — |
| His | 24.7 | 130% |
| Ala | 45.2 | — |
| Asp | 87.3 | — |
| Glu + Gln | 243.2 | — |
| Gln | 154.1 | — |
| Gly | 46.2 | — |
| Pro | 44.4 | — |
| Ser | 45.9 | — |

Therefore the nutritional composition fully meets the FAO/WHO recommendations for children over the age of 2 years. Further, the nutritional composition contains about 15 g/100 g of amino acids of glutamine and about 10 g/100 g of amino acids of arginine.

We claim:

1. A nutritional composition for providing glutamine, the composition being in a liquid concentrate or ready-to-drink liquid form and comprising: a protein source including carob protein and a source of cysteine.

2. A nutritional composition according to claim 1 which further comprises a carbohydrate source; and a lipid source.

3. A nutritional composition according to claim 2 in which the protein source provides about 10% to about 30% of the energy of the nutritional composition; the carbohydrate source provides about 35% to about 60% of the energy of the nutritional composition; and the lipid source provides about 20% to about 40% of the energy of the nutritional composition.

4. A nutritional composition according to claim 1 in which the carob protein is in the form of a protein isolate or hydrolysate.

5. A nutritional composition according to claim 1 in which the carob protein provides about 40% to about 90% by weight of the protein source.

6. A nutritional composition according to claim 5 which includes an additional source of methionine selected from the group consisting of casein, whey, soy, rice and oat bran protein, or mixtures thereof.

7. A nutritional composition according to claim 2 in which the lipid source comprises a mixture of medium chain triglycerides and long chain triglycerides.

8. A nutritional composition according to claim 7 in which the lipid source comprises at about 20% to about 80% by weight of medium chain triglycerides.

9. A nutritional composition according to claim 2 in which the lipid source has a polyunsaturated fatty acid omega-6 (n-6) to omega-3 (n-3) ratio of about 4:1 to about 15:1.

10. A nutritional composition according to claim 9 in which the omega-3 and omega-6 fatty acids provide less than about 10% of total energy.

11. A nutritional composition according to claim 1 further comprising a source of tryptophan.

12. A liquid nutritional composition for providing glutamine, the composition comprising a protein source including carob protein cysteine and an additional source of methionine.

13. A nutritional composition according to claim 12 in which the protein source includes at least 24 mg/g protein of methionine and cysteine.

14. A nutritional composition according to claim 13 in which the source of methionine and cysteine is at least one component chosen from the group consisting of whey and casein.

15. A nutritional composition according to claim 12 which further comprises a carbohydrate source; and a lipid source.

16. A nutritional composition according to claim 15 in which the protein source provides about 10% to about 30% of the energy of the nutritional composition; the carbohydrate source provides about 35% to about 60% of the energy of the nutritional composition; and the lipid source provides about 20% to about 40% of the energy of the nutritional composition.

17. A nutritional composition according to claim 12 further comprising a source of tryptophan.

18. A liquid nutritional composition for providing glutamine, the composition having a protein source comprising an isolate or hydrolysate of carob protein; cysteine and an additional source of methionine.

19. A nutritional composition according to claim 18 in which the protein source includes at least 24 mg/g protein of methionine and cysteine.

20. A nutritional composition according to claim 19 in which the source of methionine and cysteine is at least one component chosen from the group consisting of whey and casein.

21. A nutritional composition according to claim 18 which further comprises a carbohydrate source; and a lipid source.

22. A nutritional composition according to claim 21 in which the protein source provides about 10% to about 30% of the energy of the nutritional composition; the carbohydrate source provides about 35% to about 60% of the energy of the nutritional composition; and the lipid source provides about 20% to about 40% of the energy of the nutritional composition.

23. A nutritional composition according to claim 18 further comprising a source of tryptophan.

24. A method of providing glutamine to a human or animal, the method comprising enterally administering to a human or animal in need thereof an effective amount of a liquid nutritional composition having a protein source including carob protein.

25. A method according to claim 24 in which the protein source includes a source of ripteine and an additional source of methionine.

26. A method according to claim 24 in which the human or animal is a stressed patient.

27. A method according to claim 26 in which the patient is critically ill, or is suffering from sepsis, injury, burns, or inflammation, or is recovering from surgery.

28. A method of improving the immune function of a human or animal by providing glutamine and arginine to the patient, the method comprising enterally administering to the patient an effective amount of a liquid nutritional composition having a protein source including carob protein.

29. A method according to claim 28 in which the protein source includes a source of cypteine and an additional source of methionine.

30. A method of providing glutamine to patients suffering from injured or diseased intestines or to maintain the physiological functions of the intestine, the method comprising enterally administering to the patient an effective amount of a liquid nutritional composition having a protein source including carob protein.

31. A method according to claim 30 in which the protein source includes a source of cysteine and an additional source of methionine.

32. A method of increasing plasma glutamine levels in a human or animal, the method comprising enterally administering to a human or animal in need thereof an effective amount of a liquid nutritional composition having a protein source including carob protein.

33. A method according to claim 32 in which the protein source includes a source of cysteine and an additional source of methionine.

\* \* \* \* \*